(12) United States Patent
Shinagawa et al.

(10) Patent No.: US 9,202,140 B2
(45) Date of Patent: Dec. 1, 2015

(54) QUOTIENT APPEARANCE MANIFOLD MAPPING FOR IMAGE CLASSIFICATION

(75) Inventors: Yoshihisa Shinagawa, Downingtown, PA (US); Yuping Lin, Los Angeles, CA (US); Gerardo Hermosillo Valadez, West Chester, PA (US); Bing Jian, Exon, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1338 days.

(21) Appl. No.: 12/502,510

(22) Filed: Jul. 14, 2009

(65) Prior Publication Data

US 2010/0061609 A1    Mar. 11, 2010

Related U.S. Application Data

(60) Provisional application No. 61/094,447, filed on Sep. 5, 2008, provisional application No. 61/158,532, filed on Mar. 9, 2009.

(51) Int. Cl.
*G06K 9/62* (2006.01)
*G06T 7/00* (2006.01)

(52) U.S. Cl.
CPC ............ *G06K 9/6252* (2013.01); *G06K 9/6212* (2013.01); *G06T 7/0012* (2013.01); *G06T 2207/10072* (2013.01); *G06T 2207/20081* (2013.01); *G06T 2207/30032* (2013.01); *G06T 2207/30064* (2013.01); *G06T 2207/30068* (2013.01)

(58) Field of Classification Search
USPC ......... 382/128–133, 155, 156, 159, 160, 190, 382/199, 209, 224–228; 707/722–735
See application file for complete search history.

(56) References Cited

U.S. PATENT DOCUMENTS

| | | | | |
|---|---|---|---|---|
| 5,036,463 | A * | 7/1991 | Abela et al. | 382/130 |
| 5,392,130 | A * | 2/1995 | Mahoney | 358/400 |
| 5,660,181 | A * | 8/1997 | Ho et al. | 600/408 |
| 5,796,861 | A * | 8/1998 | Vogt et al. | 382/128 |
| 5,825,936 | A * | 10/1998 | Clarke et al. | 382/261 |
| 5,832,103 | A * | 11/1998 | Giger et al. | 382/130 |
| 6,053,865 | A * | 4/2000 | Sugiyama et al. | 600/300 |
| 6,415,305 | B1 * | 7/2002 | Agrawal et al. | 715/232 |
| 6,845,342 | B1 * | 1/2005 | Basser et al. | 702/183 |
| 7,117,026 | B2 * | 10/2006 | Shao et al. | 600/411 |
| 7,319,328 | B1 * | 1/2008 | Karmonik et al. | 324/318 |
| 7,355,597 | B2 * | 4/2008 | Laidlaw et al. | 345/419 |

(Continued)

OTHER PUBLICATIONS

Dalel et al. "Histograms of Oriented Gradients for Human Detection" IEEE Computer Society Conference on Computer Vision and Pattern Recognition (2005), pp. 886-893 (vol. 1).*

(Continued)

*Primary Examiner* — Chan Park
*Assistant Examiner* — Mia M Thomas
(74) *Attorney, Agent, or Firm* — Peter R. Withstandley

(57) ABSTRACT

Described herein is a technology for facilitating classification of an object. In one implementation, at least one quotient appearance manifold mapping is constructed from a sample image to untangle appearance fiber bundles. A feature characteristic of the sample image may then be extracted based on the quotient appearance manifold mapping. A classifier may further be trained based on the extracted feature, and adapted for associating the object with an object class.

19 Claims, 18 Drawing Sheets

(56) References Cited

U.S. PATENT DOCUMENTS

| | | | | |
|---|---|---|---|---|
| 7,365,334 | B1* | 4/2008 | Gordon | 250/363.04 |
| 7,411,393 | B2* | 8/2008 | Zhang | 324/307 |
| 7,630,530 | B2* | 12/2009 | McGraw et al. | 382/128 |
| 7,865,002 | B2* | 1/2011 | Basilico et al. | 382/128 |
| 7,889,899 | B2* | 2/2011 | Nadar et al. | 382/128 |
| 7,906,965 | B2* | 3/2011 | Koay | 324/312 |
| 7,970,194 | B2* | 6/2011 | Kimura | 382/131 |
| 7,994,784 | B2* | 8/2011 | Yanasak et al. | 324/307 |
| 8,055,038 | B2* | 11/2011 | Goto | 382/128 |
| 8,098,068 | B2* | 1/2012 | Yanasak et al. | 324/309 |
| 8,132,913 | B2* | 3/2012 | Hirose et al. | 351/206 |
| 8,134,363 | B2* | 3/2012 | Yanasak et al. | 324/307 |
| 8,165,361 | B2* | 4/2012 | Li et al. | 382/128 |
| 8,169,216 | B2* | 5/2012 | Yanasak | 324/307 |
| 8,400,458 | B2* | 3/2013 | Wu et al. | 345/503 |
| 2002/0057829 | A1* | 5/2002 | Kasai | 382/132 |
| 2002/0111742 | A1* | 8/2002 | Rocke et al. | 702/19 |
| 2003/0174873 | A1* | 9/2003 | Giger et al. | 382/128 |
| 2003/0234781 | A1* | 12/2003 | Laidlaw et al. | 345/419 |
| 2004/0001618 | A1* | 1/2004 | Johnson et al. | 382/131 |
| 2004/0064029 | A1* | 4/2004 | Summers et al. | 600/407 |
| 2004/0066956 | A1* | 4/2004 | Ashton | 382/128 |
| 2004/0072143 | A1* | 4/2004 | Timmis et al. | 435/4 |
| 2004/0146204 | A1* | 7/2004 | Ashton | 382/224 |
| 2004/0190763 | A1* | 9/2004 | Giger et al. | 382/132 |
| 2005/0013471 | A1* | 1/2005 | Snoeren et al. | 382/131 |
| 2005/0048547 | A1* | 3/2005 | Zhao et al. | 435/6 |
| 2005/0080327 | A1* | 4/2005 | Jenkins et al. | 600/407 |
| 2005/0141769 | A1* | 6/2005 | Ho et al. | 382/225 |
| 2005/0281457 | A1* | 12/2005 | Dundar | 382/159 |
| 2005/0286750 | A1* | 12/2005 | Dehmeshki | 382/131 |
| 2006/0115159 | A1* | 6/2006 | Rexhepi | 382/199 |
| 2006/0239523 | A1* | 10/2006 | Stewart et al. | 382/128 |
| 2006/0269111 | A1* | 11/2006 | Stoecker et al. | 382/128 |
| 2007/0038119 | A1* | 2/2007 | Chen et al. | 600/476 |
| 2007/0050073 | A1* | 3/2007 | Unal et al. | 700/119 |
| 2007/0081712 | A1* | 4/2007 | Huang et al. | 382/128 |
| 2007/0124117 | A1* | 5/2007 | Zhang | 702/189 |
| 2007/0140565 | A1* | 6/2007 | Lin et al. | 382/203 |
| 2007/0160271 | A1* | 7/2007 | Doi et al. | 382/128 |
| 2007/0186152 | A1* | 8/2007 | Gurcan et al. | 715/509 |
| 2007/0258620 | A1* | 11/2007 | Nadar et al. | 382/100 |
| 2008/0069417 | A1* | 3/2008 | Kimura | 382/131 |
| 2008/0205761 | A1 | 8/2008 | Han et al. | |
| 2008/0212863 | A1* | 9/2008 | Goto | 382/131 |
| 2008/0228446 | A1* | 9/2008 | Baraniuk et al. | 702/189 |
| 2009/0041310 | A1* | 2/2009 | Yang et al. | 382/118 |
| 2009/0054740 | A1* | 2/2009 | Gudmundsson et al. | 600/300 |
| 2009/0154784 | A1* | 6/2009 | Igarashi | 382/131 |
| 2009/0220429 | A1* | 9/2009 | Johnsen et al. | 424/9.3 |
| 2010/0013832 | A1* | 1/2010 | Xiao et al. | 345/420 |
| 2010/0061609 | A1* | 3/2010 | Shinagawa et al. | 382/131 |
| 2010/0158330 | A1* | 6/2010 | Guissin et al. | 382/128 |
| 2010/0214290 | A1* | 8/2010 | Shiell et al. | 345/420 |
| 2010/0226549 | A1* | 9/2010 | Smous et al. | 382/128 |

OTHER PUBLICATIONS

Murase et al. "Visual Learning and Recognition of 3-D Objects from Appearance" International Journal of Computer Vision 14, pp. 5-24 (1995).*

Kobayashi et al. "Clinical efficacy of a newly developed free-breathing and high b-value MR diffusion weighted imaging method for the assessment of malignancy of the trunk." Proceedings of Soc. Mag. Reson. Med 13 (2005) p. 1.*

Grimaud et al. "Quantification of MRI lesions Load in Multiple Sclerosis" MRI vol. 14, No. 5, pp. 1-11 (1996).*

Zhu et al. "Fast Human Detection Using a Cascade of Histograms of Oriented Gradients" IEEE Computer Society Conference on Computer Vision and Pattern Recognition (CVPR 2006) pp. 1-8.*

Dalal et al. "Histograms of Oriented Gradients for Human Detection" pp. 1-8.*

Tenenbaum et al. "A Global Geometric Framework for Nonlinear Dimensionality Reduction" Science vol. 290, Dec. 2000 pp. 1-5.*

Haralick et al. "Textural Features for Image Classification" IEEE Transactions on Systems, Man and Cybernetics, vol. 3, No. 6, Nov. 1973, pp. 1-12.*

Dalal et al. "Histograms of Oriented Gradients for Human Detection" Computer Vision and Pattern Recognition, Jun. 2005, pp. 1-8.*

Navneet Dalal and Bill Triggs, "Histograms of Oriented Gradients for Human Detection", INRIA Rhone-Alps; http://inrialpes.fr.

Rainer Lienhart and Jochen Maydt: "An Extended Set of Haar-like Features for Rapid Object Detection", Intel Labs, Intel Corporation, Santa Clara, CA 95052, US: Rainer.Lienhart@intel.com.

Matthew Turk and Alex Pentland, "Eigenfaces for Recognition", Vision and Modeling Group, The Media Laboratory, Massachusetts Institute of Technology; Journal of Cognitive Neuroscience vol. 3, No. 1; Magazine; pp. 271-286.

Draper, Baek, Bartlett and Beveridge; Dept. of Computer Science, Colorado State University (Draper, Beveridge); "Recognizing Faces with PCA and ICA", pp. 1-26, Columbia University (Baek); Univ. of San Diego (Bartlett).

Guetat, et al.; "Automatic 3D Grayscale Volume Matching and Shape Analysis", IEEE Transactions on Information Technology in Biomedicine 2005; pp: 1-13, Magazine; 2005.

He, Yan, Hu, Niyogi and Zhang; "Face Recognition Using Laplacianfaces", Dept. of Computer Science, Univ. of Chicago; Microsoft Research Asia; Dept. of Information Science, School of Mathematical Sciences, Beijing University.

Kim, et al.; "Effective Representation Using ICA for Face Recognition Robut to Local Distortion and Partial Occlusion", School of Information & Communication Engineering, Sungkyukwan University, Korea.

Lee, et al.; "Video-Based Face Recognition Using Probabilistic Appearance Manifolds", 1063-6919/03; 2003 IEEE; Magazine; 2003; US.

Lin, et al.; "Riemannlan Manifold Learning", IEEE Transactions on Patetern Anaylsis and Machine Intelligence, vol. 30, No. 5, May 2008; published by the IEEE Computer Society; Magazine; 2008; US.

Liu, et al; "Face Authentication for Multiple Subjects Using Eigenflow", Dept. of Electrical and Computer Engineering, Carnegie Mellon University; Corresponding author Tsuhan Chen, Dept. of Electrical and Computer Engineering, Carnegie Mellon University; 5000 Forbes Ave Pittsburgh, PA 15213-3890; US.

Stephane G. Mallat; "A Theory for Multiresolution Signal Decomposition: The Wavelet Representation", IEEE Transactions on Pattern Analysis and Machine Intelligence; vol. 11, No. 7, Jul. 1989; Others; 1989; US.

Okada, et al.; "The Bochum/USC Face Recognition System and How it Fared in the FERET Phase III Test", Computer Science Dept. and Center for Neural Engineering; co-authors Steffens, Maurer, Hong, Elagin, Neven and Malsburg.

Rueckert, et al.; "Automatic Construction of 3-D Statistical Deformation Models of the Brain Using Nonrigid Registration", IEEE Transactions on Medical Images, vol. 22, No. 8, Aug. 2003; co-authors Frangi and Schnabel; Magazine; 2003; US.

Shotton, Blake, and Cipolla; "Multi-Scale Categorical Object Recognition Using Contour Fragments", IEEE Transactions of Pattern Analysis and Machine Intelligence; Others; US.

Sun (Kang B.) and Super (Boaz J.) of Dept. of Computer Science, Univ. of Illinois at Chicago; "Classification of Contour Shapes Using Class Segment Sets", US.

Chan et al, "Mathematical Expression Recognition: A Survey," The Hong Kong University of Science & Technology, Technical Report HKUST-CS99-04, Apr. 1999, pp. 1-24.

Office Action for U.S. Appl. No. 12/346,376, mailed on Mar. 26, 2012, Yu Shi, "Segment Sequence-Based Handwritten Expression Recognition," 11 pages.

Tapia et al., "Recognition of On-line Handwritten Mathematical Formulas in the E-Chalk System," Proceedings of the Seventh International Conference on Document Analysis and Recognition (ICDAR 2003), 2003, 5 pages.

Navneet Dalal and Bill Triggs, "Histograms of Oriented Gradients for Human Detection", INRIA Rhone-Alps; http://iear.inrialpes.fr; Computer Vision and Patt. Rec. Jun. 2005.

(56) References Cited

OTHER PUBLICATIONS

Rainer Lienhart and Jochen Maydt: "An Extended Set of Haar-like Features for Rapid Object Detection", Intel Labs, Intel Corporation, Santa Clara, CA 95052, US: Rainer.Lienhart@intel.com, Image Processing Proc. International Conf (2002).

Arbter, et al.; "Application of Affine-Invariant Fourier Descriptors to Recognition of 3-D Objects", IEEE Transactions on Pattern Analysis and Machine Intelligence, vol. 12, No. 7, Jul. 1990; pp: 640-647; Magazine.

Matthew Turk and Alex Pentland, "Eigenfaces for Recognition", Vision and Modeling Group, The Media Laboratory, Massachusetts Institute of Technology; Journal of Cognitive Neuroscience vol. 3, No. 1; Magazine; pp. 271-286, Nov. 1991.

Chenjun Liu (Dept. of Math and Computer Science, Univ. of MO, St. Louis, MO 63121) and Harry Wechsler (Dept. of Computer Science, George Mason University, Fairfax, VA 22030); "A Gabor Feature Classifier for Face Recognition" 2001; IEEE; Others; 2001; pp. 270-275.

David G. Lowe; "Distinctive Image Features from Scale-Invariant Keypoints", Computer Science Dept., Univ. of British Columbia; Vancouver, B.C. Canada; lowe@cs.ubc.ca; Magazine; 2004; pp. 1-28.

Serge Belongie, Member, IEEE, Jitendra Malik, Member, IEEE, and Jan Puzicha; "Shape Matching and Object Recognition Using Shape Contexts", IEEE Transactions or Pattern Analysis and Machine Intelligence; vol. 24, No. 24, Apr. 2002; Magazine; 2002; US.

Draper, Baek, Bartlett and Beveridge; Dept. of Computer Science, Colorado State University (Draper, Beveridge); "Recognizing Faces with PCA and ICA", pp. 1-26, Columbia University (Baek); Univ. of San Diego (Bartlett); vol. 91, Issues 1-2, Jul.-Aug. 2003, pp. 115-137.

Guetat, et al.; "Automatic 3D Grayscale Volume Matching and Shape Analysis", IEEE Transactions on Information Technology in Biomedicine 2005; pp. 1-13, Magazine; 2005.

He, Yan, Hu, Niyogi and Zhang; "Face Recognition Using Laplacianfaces", Dept. of Computer Science, Univ. of Chicago; Microsoft Research Asia; Dept. of Information Science, School of Mathematical Sciences, Beijing University, IEEE Transactions Pattern Analysis vol. 27 Mar. 2005.

Ikena, et al.; "Development, Standardization, and Testing of a Lexicon for Reporting Contrast-Enhanced Breast Magnetic Resonance Imaging Studios", Journal of Magnetic Resonance Imaging 13:889-895; Magazine; 2010; US.

Kim, et al.; "Effective Representation Using ICA for Face Recognition Robut to Local Distortion and Partial Occlusion", School of Information & Communication Engineering, Sungkyukwan University, Korea, Oct. 2005.

Lee, et al.; "Video-Based Face Recognition Using Probabillistic Appearance Manifolds", 1063-6919/03; 2003 IEEE; Magazine; 2003; US.

Lin, et al.; "Riemannian Manifold Learning", IEEE Transactions on Patetern Anaylsis and Machine Intelligence, vol. 30, No. 5, May 2008; published by the IEEE Computer Society; Magazine; 2008; US.

Liu, Member, IEEE; "Gabor-Based Kernel PCA with Fractional Power Polynomial Models for Face Recognition", IEEE Transactions on Pattern Analysis and Machine Intelligence, vol. 26, No. 5, May 2004; Magazine; 2004; US.

Liu, et al; "Face Authentication for Multiple Subjects Using Eigenflow", Dept. of Electrical and Computer Engineering, Carnegie Mellon University; Corresponding author Tsuhan Chen, Dept. of Electrical and Computer Engineering, Carnegie Mellon University; 5000 Forbes Ave., Pittsburgh, PA 15213-3890; US, Feb. 2003.

Stephane G. Mallat; "A Theory for Multiresolution Signal Decompostion: The Wavelet Representation", IEEE Transactionson Pattern Analysis and Machine Intelligence; vol. 11, No. 7, Jul. 1989; Others; 1989; US.

Okada, et al.; "The Bochum/USC Face Recognition System and How it Fared in the FERET Phase III Test", Computer Science Dept. and Center for Neural Engineering; co-authors Steffens, Maurer, Elgain, Nevan and Malsburg, 1998.

Rowels and Saul; "Nonlinear Dimensionality Reduction by Locally Linear Embedding", SCIENCE Magazine, vol. 290, Dec. 22, 2000; www.sciencemag.org; pp. 2323-2326; Magazine; 2000; US.

Rueckert, et al.; "Automatic Construction of 3-D Statistical Deformation Models of the Brain Using Nonrigid Registration", IEEE Transactions on Medical Images, vol. 22, No. 8, Aug. 2003; co-authors Fragl and Schnabel; Magazine; 2003; US.

Sharon and Mumford, Both of Division of Applied Mathematics, Brown University, Providence, RI; "2D-Shape Analysis using Conformal Mapping" published by IEEE 2004; Others; 2004; US.

Shotton, Blake, and Cipolla; "Multi-Scale Categorical Object Recognition Using Contour Fragments", IEEE Transcations of Pattern Analysis and Machine Intelligence; Others: US, Jun. 2008.

Siddiqi, et al.; "Shock Graphs and Shape Matching", Authors from Center for Computational Vision & Conrol, Yale Univ., New Haven, CT and Dept. of Computer Science & Center for Cognitive Science, Rutgers Univ., New Brunswick, NJ; published in condensed version in Proceedings of the Sixth International Conference on Computer Vision, Bombay, Jan. 4-7, 1998; Magazine; 1998; IN.

Sun (Kang B.) and Super (Boaz J.) of Dept. of Computer Science, Univ. of Illinois at Chicago; "Classification of Contour Shapes Using Class Segment Sets", US, Jun. 2005.

Tefas, et al. "Using Support Vector Machines to Enhance the Performance of Elastic Graph Matching for Frontal Face Authentication", IEEE Members; published in IEEE Transactions on Pattern Analysis and Machine Intelligence, vol. 23, No. 7, Jul. 2001; Others; 2001; US.

Tenenbaum, et al.; "A Global Geometric Framework for Nonlinear Dimensionality Reduction", published in Science Magazine vol. 290 (www.sciencemag.org); Dec. 22, 2000; pp. 2319-2323; Magazine; 2000; US.

Tsai, et al.; "A Shape-Based Approach to the Segmentation of Medical Imagery Using Level Sets", IEEE Transactions on Medical Imaging, vol. 22, No. 2, Feb. 2003; Others; 2003; US.

Paul Viola and Michael Jones; "Robust Real-time Object Detection", Mitsubishi Electric Research Labs, Cambridge, MA and Compaq CRL, Cambridge, MA; Second International Workshop on Statistical and Computational Theories of Vision-Modeling, Learning, Computing and Sampling; Vancouver, Canada; Jul. 13, 2001; Others; 2001; CA.

Yang, et al.; "Kernel Eigenfaces vs. Kernel Fisherfaces: Face Recognition Using Kernel Methods", Honda Fundamental Research Labs, Mountain View, CA; In Proceedings of the Fifth IEEE International Conference on Automatic Face and Gesture Recognition; pp. 215-220, 2002; Book; 2002; US.

Zhou, et al.; "BoostMotion: Boosting a discriminative similarity function for motion estimation", Integrated Data Systems Dept., Siemens Corporate Research, Princeton, NJ; IEEE 2006; Others; 2006; US.

* cited by examiner (A) round+oval (B) lobular (C) irregular (A) round+oval (B) lobular (C) irregular(shape)

(A) round + oval (B) lobular (C) irregular

US 9,202,140 B2

QUOTIENT APPEARANCE MANIFOLD MAPPING FOR IMAGE CLASSIFICATION

CROSS-REFERENCE TO RELATED APPLICATIONS

The present application claims the benefit of U.S. provisional application No. 61/094,447 filed Sep. 5, 2008 and U.S. provisional application No. 61/158,532 filed Mar. 9, 2009, the entire contents of which are herein incorporated by reference.

TECHNICAL FIELD

The present disclosure relates to image classification and more specifically to quotient appearance manifold mapping for image classification.

BACKGROUND

Various imaging systems and tools have been developed to assist physicians, clinicians, radiologists, etc. in evaluating medical images to diagnose medical conditions. For example, computer-aided detection (CAD) tools have been developed for various clinical applications to provide automated detection of medical conditions captured in medical images, such as colonic polyps and other abnormal anatomical structures such as lung nodules, lesions, aneurysms, calcification, in breast, heart or artery tissue.

The morphology of a lesion, such as its shape or boundary (i.e. margin), provides useful clues in identifying whether the lesion is malignant or not. For example, FIGS. 1a-b show middles slices of lesions with various types of shapes and boundaries respectively. As illustrated in FIG. 1a, lesions may be classified according to: (A) round, (B) oval, (C) lobulated or (D) irregular shapes. Lesions may also be classified based on: (A) smooth, (B) irregular or (C) spiculated boundaries, as shown in FIG. 1b. A lesion with spikes (i.e. spiculation) or an irregular boundary or shape is more likely to be malignant than a lesion with a smooth boundary or round (or oval) shape. In other words, smoothness of a lesion shape or boundary is related to benignity while irregularity is related to malignancy.

Classifiers may be developed to distinguish lesions based on their morphologies so as to facilitate the diagnosis of cancer. Various methods have been proposed to classify two-dimensional (2D) binary images based on shape context, segment sets, mode-based approaches and shock graphs. Typically, the contours of binary images are parameterized by a normalized arc length (a) to yield a pair of univariate functions (x(a), y(a)), with only one rotational Degree of Freedom (DOF). The origin may be fixed to circumvent the problem of handling the rotational DOF. Such parameterization facilitates the use of many convenient tools such as Fourier analysis, wavelet decomposition, and Principal Component Analysis (PCA).

It is difficult, however, to employ similar strategies for three-dimensional (3D) grayscale images because of the difficulty in parameterizing 3D grayscale images consistently. The parameterization techniques used for 2D binary images do not apply to 3D grayscale images. Cartesian coordinates are useless because they depend on origins and posture, which are either unrelated to the objects in 3D images, absent or undefined.

Therefore, there is a need to provide a technology that effectively classifies objects in 3D volume sets of grayscale images with high accuracy and computational efficiency.

SUMMARY

A technology for facilitating classification of an object is described herein. In accordance with one implementation, at least one quotient appearance manifold mapping is constructed from a sample image to untangle appearance fiber bundles. A feature characteristic of the sample image may then be extracted based on the quotient appearance manifold mapping. A classifier may further be trained based on the extracted feature, and adapted for associating the object with an object class.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present systems and methods and in order to meet statutory written description, enablement, and best-mode requirements. However, it will be apparent to one skilled in the art that the present systems and methods may be practiced without the specific exemplary details. In other instances, well-known features are omitted or simplified to clarify the description of the exemplary implementations of present systems and methods, and to thereby better explain the present systems and methods. Furthermore, for ease of understanding, certain method steps are delineated as separate steps; however, these separately delineated steps should not be construed as necessarily order dependent in their performance.

Introduction

The following description sets forth one or more implementations of systems and methods that facilitate classification of an object. One aspect of the present technology uses quotient appearance manifold mapping to untangle appearance fiber bundles of different objects. This aspect of the present technology is especially effective in grayscale three-dimensional (3D) object recognition. Another aspect of the present technology reduces the dimensionality of the feature space to facilitate computationally-efficient image classification. Another aspect of the present technology directly extracts discriminative features from positive samples to create a feature space for training a classifier.

Figure 1A:
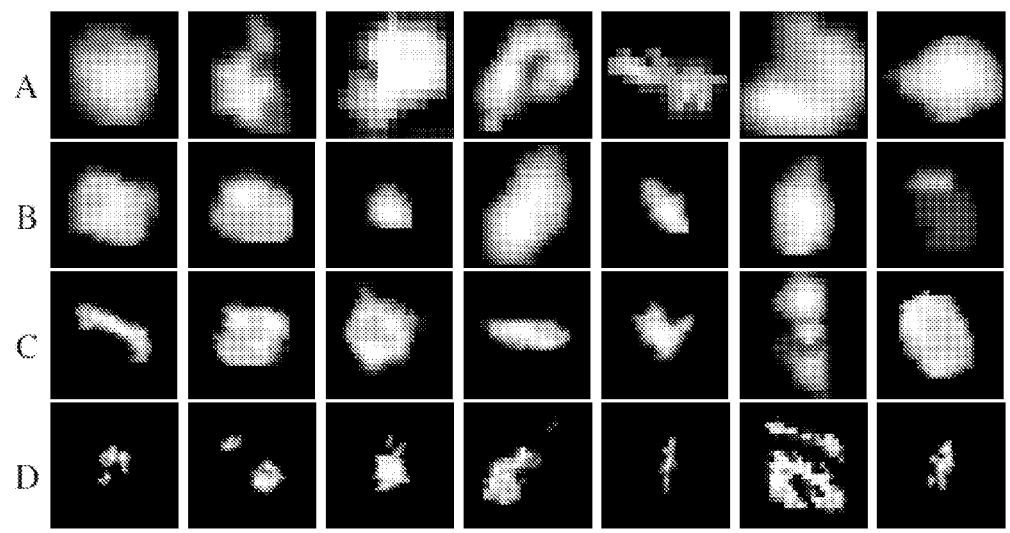
FIGS. 1a-b show lesions with various types of shapes and boundaries.
Figure 1B:
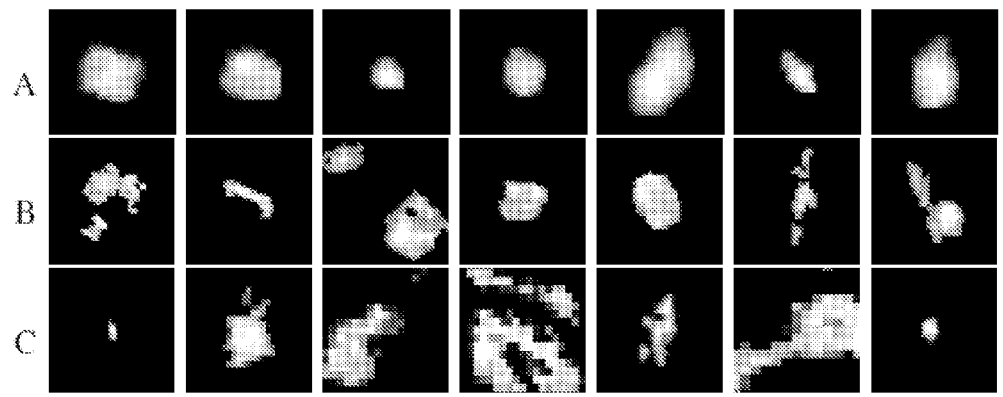

Generally, "appearance manifolds" refers to representations of physical images as points in higher dimensional abstract space. One advantage of using appearance manifolds is that it does not require customized feature development. Unlike conventional methods that require margins in grayscale images to be detected before analysis, appearance manifolds use all the pixels as features and there is no need for development of customized features. Development of customized features typically requires medical domain knowledge and long term training to capture clinical meanings of smoothness and irregularity, which are different from how a lay person ordinarily defines them. For example, turning to FIG. 1b, it can be observed that there is a large overlap between the two boundary categories A (smooth) and B (irregular) regarding "smoothness" in the ordinary sense. In other words, a lesion which is clinically classified as "irregular" may be ordinarily classified as "smooth" by a lay person.

An appearance manifold may be constructed by first interpreting a stacked vector ($\vec{x}$) of an object image I(x, y) of size m x n as a point in Euclidean space $R^{mn}$. The stacked vector ($\vec{x}$) is denoted by Equation (1) below:

$$\vec{x} = (I(0,0), I(1,0), \ldots, I(0,1), I(1,1), \ldots, I(m,n)) \quad (1)$$

If the object changes slightly, the point changes its location in Euclidean space slightly. The dimension of the set of such points is expected to be much lower than mn if the images are generated by taking photographs of the same object. The set is regarded as the embedding in the Euclidean space ($R^{mn}$) of the appearance manifold M. The appearance manifold of an object (e.g., face of a person) is generally separable from the appearance manifold of another object.

An image has a relatively small number of Degrees of Freedom (DOFs), such as the camera angle and illumination direction. For example, if a face of a person is viewed in a slightly different direction, the image changes slightly. Such slight variations will form a curved line in the Euclidean space ($R^{mn}$) in which the manifold is embedded. The trajectory of the stacked vector ($\vec{x}$) may be generalized as a fiber (F) of a fiber bundle (E, M, Π, F), where M denotes the base space, E denotes the total space and Π is a projection of the total space to the base space (i.e. Π: E→M).

The projection Π satisfies the condition that for any point p ☐ M, there exists a neighborhood U ⊂ M of p such that $Π^{-1}$(U) is homeomorphic to U×F by φ in the following way:

$$Π(φ(p, f)) = p \quad (2)$$

where f ⊂ F. In other words, in the neighborhood U(p), E looks like M×F. In the case of an appearance manifold M, the trajectory of the stacked vector ($\vec{x}$) is a fiber f. E can generally be regarded as the manifold M with the fiber f sticking out at every point p. The fiber bundle (E, M, Π, F) of the appearance manifold defined as shown above is hereinafter referred to as the "appearance fiber bundle."

Figure 2:
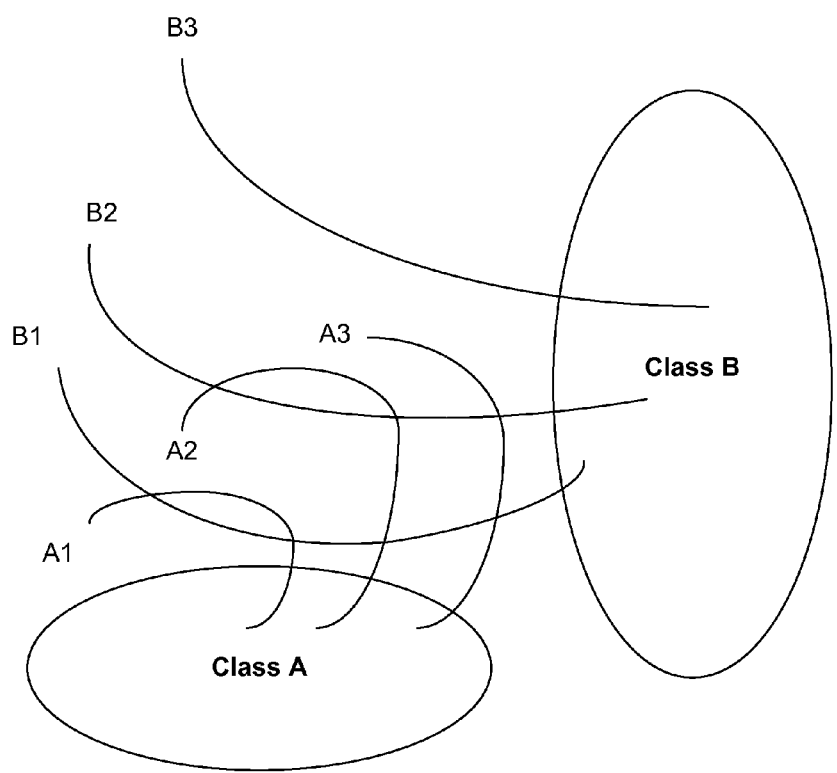
FIG. 2 illustrates the entanglement of appearance fiber bundles of two shape classes.

In contrast to an appearance fiber bundle of a single object, the appearance fiber bundle of a shape or boundary class is typically entangled with the appearance fiber bundle of other shape or boundary classes. FIG. 2 illustrates the entanglement of appearance fiber bundles of two classes (A and B). Objects A1, A2 and A3 belong to Class A while objects B1, B2 and B3 belong to another Class B. When the objects are translated in the images, they form trajectories (i.e. fibers) in the embedded space of the manifold. Suppose an object is to be classified according to whether it belongs to Class A or Class B. One problem is that the trajectories (i.e. fibers) of the objects of Class A are entangled with the trajectories of the objects of Class B. For example, an image on the fiber of Object B1 may be closer to the Shape A objects than an image on the trajectory of Object A1, depending on the locations on their fibers. Under such circumstances where fiber bundles are entangled, it is difficult to reduce the dimensionality of the manifolds. The entanglement becomes even more complicated when the transformation is a nonlinear deformation (e.g., rotation) instead of a simple translation.

These difficulties arise because only the total space E embedded in the Euclidean space $R^{mn}$ may be observed as images, not the appearance manifolds themselves. One solution is to decompose the total space into the fiber F and the appearance manifold M. The solution is not very complicated when an object-centric coordinate system can be uniquely chosen, like in a face-recognition application (i.e., most of the fibers can be eliminated and M can be inferred in the embedded space). However, when the objects have to be classified into more ambiguous groups, such as according to the shapes or boundaries of 3D grayscale objects, the choice of a unique manifold is very often impossible.

This situation may be described using matrices. Suppose an image I of size m×n is converted to a stacked image vector ($\vec{x}_0$) belonging to an appearance manifold. When it is translated by (dx, dy), where dx and dy are positive integers, the image vector) ($\vec{x}_1$) after the translation is represented by $\vec{x}_1 = P(\vec{x}_0)$. P is a permutation matrix, which may be represented by the following equation (3):

$$P = \{p_{ij}\}(i=1, \ldots, m; j=1, \ldots, n) \quad (3)$$

where $$P_{jn+i, jn+i+dx} = 1,$$

$$P_{jn+i+dx, jn+i} = 1,$$

$$P_{jn+i, (j+dy)n+i} = 1,$$

$$P_{(j+dy)n+i, jn+i} = 1,$$

for i=1, (m−dx) and j=1, . . . , (n−dy), and all the other elements are zero. Therefore, the new image vector ($\vec{x}_1$) is obtained by exchanging the axes of the coordinate system. Operations other than translation (e.g., rotation) can also be approximated by the exchange of axes while obeying much more complicated rules. As a result of such operations, the fibers of different objects are entangled and interleaved, thereby limiting the use of various dimensionality reduction tools, such as PCA, Linear Discriminant Analysis (LDA), Independent Component Analysis (ICA), and kernel PCA.

Therefore, appearance manifolds were typically not used in previous work for grayscale shape classification, particularly in 3D images, due to the problems caused by the entanglement of appearance fiber bundles. The present framework untangles the fibers of appearance manifolds by constructing a quotient space of the appearance manifold, and mapping each point of the appearance manifold to the quotient sub-manifold for image classification.

Overview of Exemplary System and Method

Figure 3:
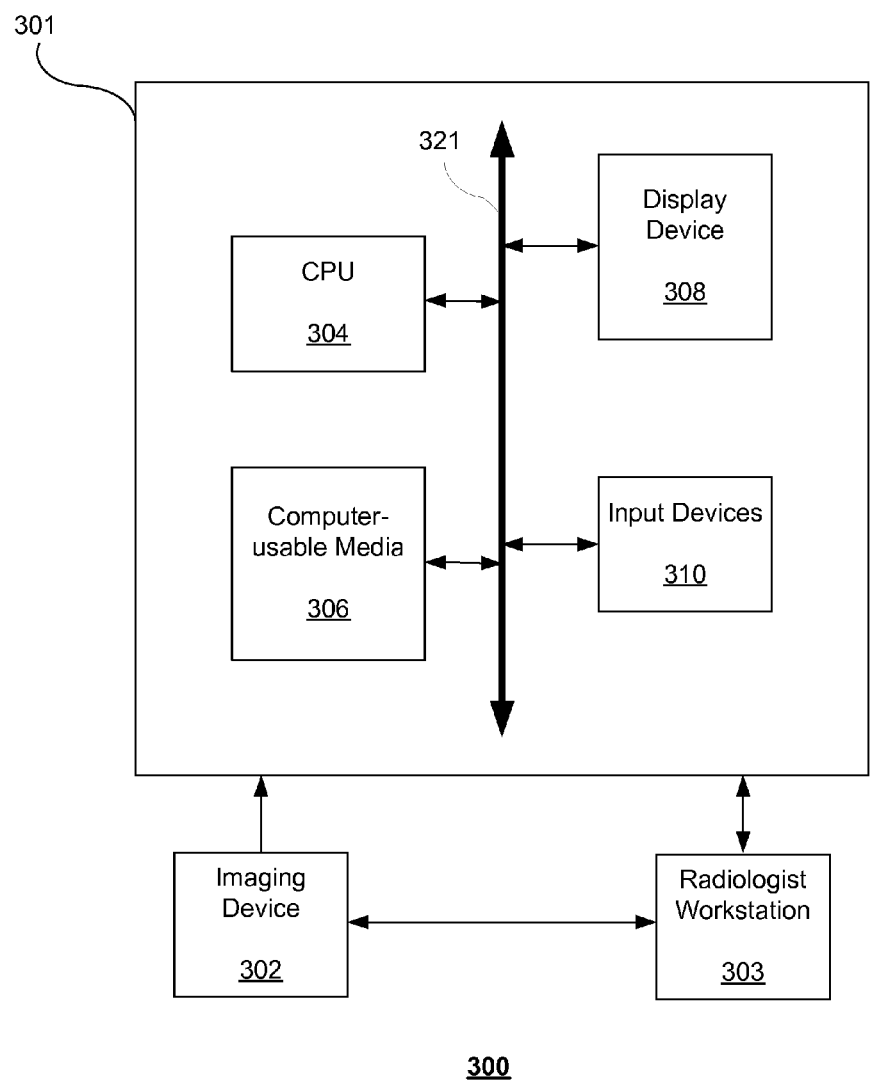
FIG. 3 shows a block diagram of an exemplary image analysis system.

FIG. 3 shows a block diagram illustrating an exemplary image analysis system 300. The image analysis system 300 includes a computer system 301 for implementing the framework as described herein. In one implementation, the image analysis system 300 comprises a CAD system. The CAD system 300 may be connected to an imaging device 302 and a radiologist workstation 303, over a wired or wireless network. The imaging device 302 may be a radiology scanner such as a magnetic resonance (MR) scanner or a computed tomographic (CT) scanner. Other types of imaging devices, such as a helical CT, X-ray, positron emission tomographic, fluoroscopic, ultrasound or Single Photon Emission Computed Tomography (SPECT) scanner, may also be useful.

Computer system 301 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 301 comprises a processor or central processing unit (CPU) 304 coupled to one or more computer-usable media 306 (e.g., computer storage or memory device), display device 308 (e.g., monitor) and various input devices 310 (e.g., mouse or keyboard) via an input-output interface 321. Computer system 301 may further include support circuits such as a cache, power supply, clock circuits and a communications bus.

It is to be understood that the present technology may be implemented in various forms of hardware, software, firmware, special purpose processors, or a combination thereof. In one implementation, the techniques described herein may be implemented as computer readable program code tangibly embodied in computer-usable media 306. Computer-usable media 306 may include random access memory (RAM), read-only memory (ROM), magnetic floppy disk, flash memory, and other types of memories, or a combination thereof. The computer-readable program code may be executed by CPU 304 to process images (e.g., MR or CT images) from imaging device 302 (e.g., MRI or CT scanner). As such, the computer system 301 is a general-purpose computer system that becomes a specific purpose computer system when executing the computer readable program code. The computer readable program code is not intended to be limited to any particular programming language and implementation thereof. It will be appreciated that a variety of programming languages and coding thereof may be used to implement the teachings of the disclosure contained herein.

Computer system 301 may also include an operating system and microinstruction code. The various techniques described herein may be implemented either as part of the microinstruction code or as part of an application program or software product, or combination thereof, which is executed via the operating system. Various other peripheral devices, such as additional data storage devices and printing devices, may be connected to the computer system 301.

The radiologist workstation 303 may include a computer and appropriate peripherals, such as a keyboard and display, and can be operated in conjunction with the entire system 300. For example, the radiologist workstation 303 may communicate with the imaging device 302 so that the image data collected by the imaging device 302 can be rendered at the radiologist workstation 303 and viewed on the display. Further, the radiologist workstation 303 may communicate directly with the computer system 301 to access previously processed image data, such as data which has undergone processing by the framework described herein, so that a radiologist can manually verify the results of the framework.

It is to be noted that in the discussion of the following FIGS. 4-16, continuing reference may be made to elements and reference numerals shown in FIG. 3. It is further noted that while a particular application directed to analysis of lesions or tumors in breast MRI is shown, the description is not limited to the specific embodiment illustrated. The present technology has application to, for example, other types of images (e.g., computed tomography (CT) images, ultrasound images, and radio isotope images) and other types of anatomical features, such as the brain, prostate, kidney and liver. The present technology may also be used in non-medical applications, such as face or object recognition.

Figure 4:
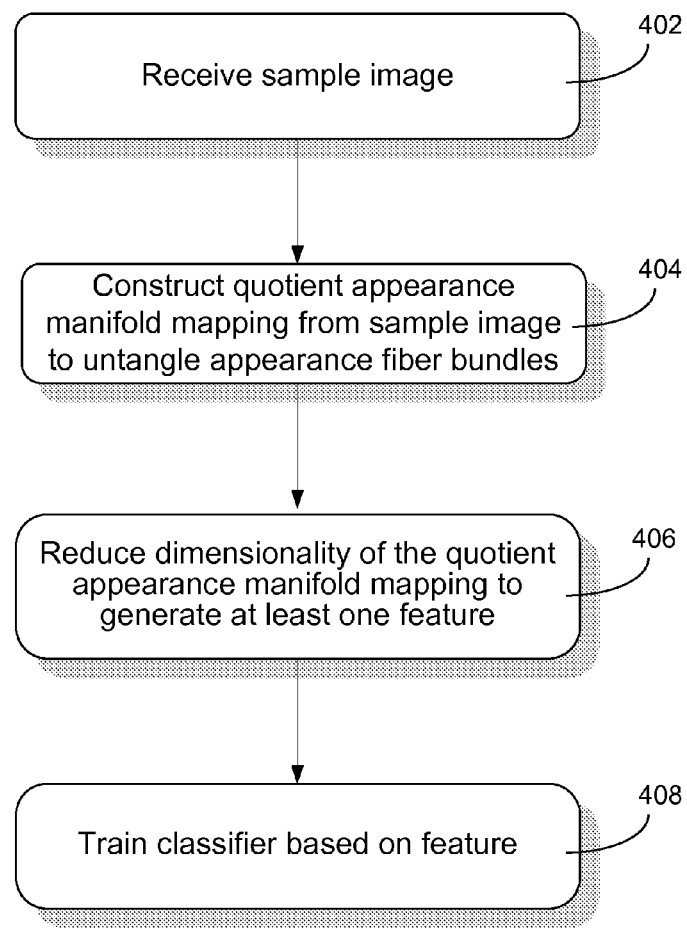
FIG. 4 shows an exemplary framework for automatically classifying an object.

FIG. 4 shows an exemplary framework 400 for automatically classifying an object. The exemplary framework 400 may be implemented by the image analysis system 300 described previously.

At step 402, the computer system 301 receives at least one sample image from, for example, imaging device 302 The imaging device 302 may have acquired the sample image by one of a magnetic resonance (MR) imaging, computed tomographic (CT), helical CT, x-ray, positron emission tomogaphic, fluoroscopic, ultrasound and Single Photon Emission Computed Tomography (SPECT) technique. The sample image may be binary (e.g., black and white) or grayscale. In addition, the sample image may be two-dimensional or three-dimensional (3D) image data. The sample image may be medical or non-medical. In one implementation, the sample image comprises a medical image of an anatomical part (e.g., breast, colon, lung). The sample image may be pre-filtered and contrast-enhanced by injecting a contrast agent (CA) into a patient. In one implementation, the sample image comprises a Dynamic Contrast-Enhanced MRI image, which may be obtained by measuring CA concentration in lesions over time.

The sample images may be pre-processed by, for example, segmenting them to delineate or identify regions of interest. A region of interest may be a potentially malignant lesion, tumor or mass in the patient's body (e.g., breast), and may be represented by one or more voxels in the image. The region of interest may be automatically detected by using a computer-aided detection technique, such as one that detects points where the increase in voxel intensity is above a certain threshold. Alternatively, the region of interest may be identified manually by, for example, a skilled radiologist.

In one implementation, the object to be classified corresponds to an abnormal tissue, such as a lesion. It is to be noted that objects corresponding to non-medical or non-living components may also be classified. A lesion may be a mass (i.e. comprising one connected component) or a non-mass (i.e. comprising scattered connected components). The shape of a lesion volume may be clinically classified as round, oval, lobulated or irregular. The boundary (i.e. margin) of a lesion may be clinically classified as smooth, irregular or spiculated (i.e. with spikes). These categories are described by the Breast Imaging Reporting and Data System (BIRADS), which is well known in the art. Other types of classifications may also be used. Round or oval shapes are mostly related to benign lesions. For example, lipids are round and fibroadenomas are oval. Irregular shapes or spiculated boundaries are often related to malignant lesions (i.e. cancers).

At step 404, at least one quotient appearance manifold mapping is constructed from the sample images. This is performed to untangle, for example, appearance fiber bundles of objects. The problem of appearance fiber bundle entanglement was described previously. This approach is particularly effective in classifying grayscale 3D images, as will be described in more detail in the following description.

At step 406, the dimensionality of the quotient appearance manifold mapping is reduced to generate at least one feature characteristic of the sample image. In one implementation, a set of features (i.e. feature vectors) are extracted from the quotient appearance manifold mapping. Dimensionality reduction transforms a quotient appearance total space associated with the quotient appearance manifold mapping into a sub-space of fewer dimensions by applying a dimension reduction technique, such as PCA, LDA, ICA, or kernel PCA. Other types of dimensionality reduction techniques may also be used. The type of dimensionality reduction technique to apply may depend on the type of classification performed. For example, for shape classification, PCA may be suitable for capturing the global properties of the images. More details will be provided below.

At step 408, at least one classifier is trained based on the feature. After training, the classifier may be applied to test images to classify objects in the test images. In one implementation, the classifier comprises a binary classifier adapted for associating an object with two classes. The trained classifier may be, for example, a shape classifier or boundary classifier. A shape classifier categorizes an object based on its shape, whereas a boundary classifier categorizes an object based on its boundary. As discussed previously, a lesion with an irregular boundary or shape is more likely to be malignant than a lesion with a smooth boundary or round (or oval) shape. Therefore, the classifier may be adapted to indicate a likelihood of malignancy of the lesion based on the morphological property.

In one implementation, the classifier comprises a binary boosted classifier, such as one obtained by performing Adaptive Boosting (AdaBoost) algorithm developed by Freund and Schapire, with some modifications. See P. Viola and M. Jones, *Robust real-time object detection*, Int. J. Comput. Vision, 57 (2):137-154, 2004. Other types of classifiers, such as those obtained by performing Quadratic Discriminant Analysis (QDA), may also be used.

The AdaBooast algorithm is a machine learning algorithm that is adaptive in the sense that subsequent classifiers built are tweaked in favor of those instances misclassified by previous classifiers. In the present framework, "decision stumps" are used as weak classifiers to train the classifier based on the input feature vector (x). A weak classifier is one with a rather high error rate. The decision stumps (h) are a family of component classifiers generating ±1 labels, denoted by Equation (4):

$$h(x; \theta) = \text{sign}(w_l x_k - w_0) \quad (4)$$

where $x_k$ is one component of the input feature vector (x), $\theta(=k(1; \ldots ; n))$ represents an index; and $w_0$, $w_l$ represent weights.

Each decision stump considers only a single component of the input feature vector (x). The combined decision stumps using the weighted vote is expected to be a highly accurate binary classifier. Unlike previous work, AdaBoost is used in the present framework merely to find the linear combinations of the weak classifiers, rather than to perform feature extraction.

Quotient Appearance Manifold Mapping

Figure 5:
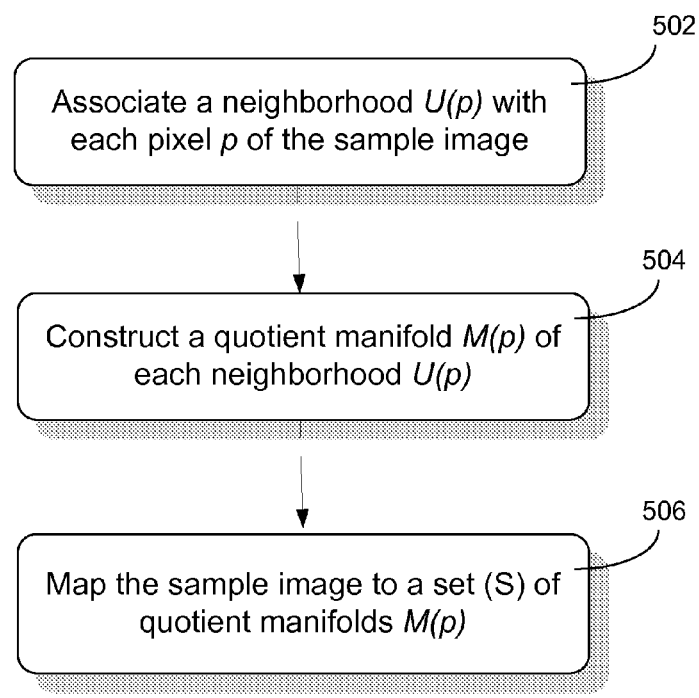
FIG. 5 shows an exemplary framework for constructing a quotient appearance manifold mapping.

FIG. 5 shows a possible implementation of step 404 for constructing a quotient appearance manifold mapping from at least one sample image to untangle appearance fiber bundles. A quotient space (i.e. identification space) or quotient manifold is constructed by identifying or "gluing together" certain points of a given space. The space to be analyzed is the "quotient appearance total space" (E/≈), and not the original total space (E) observed. The quotient appearance total space (E/≈) itself is similar to the appearance manifold (M).

To decompose a total space (E) to an appearance manifold (M) and a fiber (F), appearance fiber bundles $E_1$ and $E_2$ are identified using an equivalence relation (≈) as shown in Equation (5):

$$E_1 \approx E_2 \quad (5)$$

The points to be identified in the quotient appearance total space (E1≈) are specified by the equivalence relation (≈). The equivalence relation (≈) comprises a transformation (e.g., translation) of points from the original total space (E) to the quotient appearance total space (E1≈). Other types of transformations, such as affine transformations (e.g., rotation, scaling or translation), may also be used as the equivalence relation.

In some situations, it may not be sufficient to use affine transformations as the equivalence relation. For example, suppose that an object image is to be classified according to whether it has a smooth margin (margin class A) or an irregular margin (margin class B), as illustrated in FIG. 2. A portion of an image of object A1 may be locally deformed, but it still belongs to a class of the smooth margin (margin class A). This situation cannot be handled by an equivalence relation based on affine transformations. Instead, a quotient appearance manifold mapping may be used to map each point of the manifold to the quotient subspace, using local affine transformations as the equivalence relation. Therefore, a "quotient appearance manifold mapping" of an image comprises a set of quotient manifolds corresponding to pixels or sub-images of the image.

In particular, a quotient appearance manifold mapping of an image (I) having a stacked vector ($\vec{x}$) may be constructed using the framework shown in FIG. 5. At step 502, a neighborhood U(p) is associated with each pixel p of the image (I). This may be achieved by, for example, sub-dividing the image (I) into sub-images ($I_i$). The sub-images ($I_i$) may be represented by stacked vectors $\vec{x}_i$ (i=1, 2, . . . ). The sub-images may further be normalized such that their norms are one. i.e. $|\vec{x}_i|=1$ (i=1, 2 . . . ).

For example, a grayscale volume may be re-sampled to a volume I of m×n×l in size. The volume may be further sub-divided into, for example, eight disjoint sub-volumes $I_{i,j,k}$ (i, j, k=0, 1) of size m/2×n/2×l/2. Providing overlapping sub-volumes or sub-images may also be useful. The sub-volumes $I_{i,j,k}$ may be represented by the following equation (6):

$$I_{i,j,k}(x, y, z) = I(x+mi/2, y+nj/2, z+kl/2) \quad (6)$$

At step 504, quotient manifolds M(p) are constructed for neighborhoods U(p). The quotient manifolds M(p) may be constructed by applying the equivalence relation (≈) to the sub-images. The quotient appearance manifold mapping $M_{i,j,k}$ of the image (I) is approximated by a set (S) of quotient manifolds M(p) corresponding to the image's sub-images (or neighborhoods), as denoted in Equation (7):

$$S=\{M(p)|p \in \text{domain}(I)\} \text{ where domain}(I)=[1, m]x [1, n] \quad (7)$$

In particular, the quotient manifold M(p) of each sub-image may be constructed by transforming the sub-image ($I_i$) to another sub-image ($J_i$) of a fixed size and with a canonical position, size and posture that account for the transformation ($\Psi$). The transformation ($\Psi$) may be, for example, translation, scaling, rotation, shearing or a combination thereof. Other types of transformations may also be applied. The new sub-image ($J_i$) is calculated such that the equivalence relation $I_i \approx J_i$ holds. For example, if the transformation ($\Psi$) is translation, the sub-image $I_i$ is translated to obtain a new sub-image $J_i = \Psi(I_i)$ that is closest to $I_i$. To obtain a canonical position and rotation, an image $K_i$ is first chosen. The closeness is defined by the mean squared distance (i.e. $L^2$ norm). The sub-image $J_i$ may be defined as: $J_i = \text{argmin}_{j_i} |\Psi(I_i) - K_i|^2$. To account for rotation, the sub-image $I_i$ is rotated to generate its rotational variations, and $J_i$ is then calculated for each of the rotated variation.

For example, the image I may be rotated by 45n (n=0, 1, ..., 7) degrees on the xy-plane, and by 180 degrees to flip the z-axis to generate sixteen rotational variations. The sub-images may be generated in the same manner for each rotation. Given a dataset of sample images, one of the lesion images is chosen as the canonical image K. The best translational position of each sub-image is calculated such that the mean squared difference between the sub-image and $K_{i,j,k} = K(x+mi/2, y+nj/2, z+kl/2)$ is minimized. The resulting set (S) of sub-images ($J_i$) may be regarded as an approximation of the quotient appearance manifold mapping $\{M_{i,j,k}\}$.

At step 506, the sample image (I) may further be mapped to the set (S) of quotient manifolds M(p), as shown in Equation (8):

$$F: I \rightarrow S \quad (8)$$

A quotient appearance manifold map is analogous to a Gauss map where a surface normal ($n_x$, $n_y$, $n_z$) is associated with each point of a surface.

Dimensionality Reduction of Quotient Appearance Manifold Mapping

Figure 6:
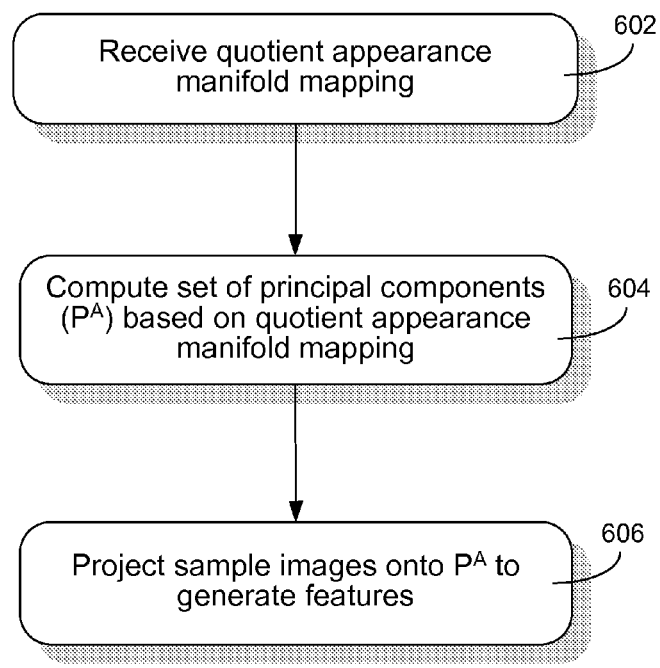
FIG. 6 illustrates an exemplary framework for reducing dimensionality of the quotient appearance manifold mapping.

FIG. 6 illustrates a possible implementation of step 406 for reducing the dimensionality of the quotient appearance manifold mapping. It is to be noted that although the present framework uses principal component analysis (PCA) to reduce the dimensionality of the quotient appearance manifold mapping, the present technology is not limited thereto. It is possible to use other types of dimensionality reduction techniques, such as LDA, ICA, or kernel PCA. In addition, other implementations may be used instead of or in addition to the framework illustrated in FIG. 6.

At step 602, a quotient appearance manifold mapping is received. The quotient appearance manifold mapping may be constructed by the framework 404 as described above.

At step 604, a set of principal components ($P_A$) is computed based on the quotient appearance manifold mapping using principal component analysis (PCA). PCA is a procedure that transforms a number of possibly correlated variables into a smaller number of uncorrelated variables called principal components. The objective of the PCA approach in the present framework is to directly capture the global characteristic variations in the images. Each principal component, starting from the highest rank, best describes the variations within the class. The first principal component accounts for as much of the variability the data as possible, and each succeeding component accounts for as much of the remaining variability as possible. In particular, the principal components may be calculated as eigenvector $\vec{e}_1, \vec{e}_2, \ldots, \vec{e}_m$ of the covariance matrix C and the mean μ. The covariance matrix C and the mean μ may be computed based on the stacked vectors that represent the points of a quotient appearance manifold mapping.

The distance between two quotient appearance manifold mappings $S_1 = \{M_1(p_1)|p_1 \in \text{domain}(I_1)\}$ and $S_2 = \{M_2(p_2)|p_2 \in \text{domain}(I_2)\}$ is defined as the sum of the Mahalanobis distance (dist) between each corresponding pair of quotient manifolds ($M_1(p_1)$ and $M_2(p_2)$), as shown in Equation (9):

$$\int_{p_1 \in \text{domain}(I_1)} \text{dist}(M_1(p_1), M_2(p_2)) \, dp_1 \quad (9)$$

The distance dist ($M_1(p_1)$, $M_2(p_2)$) may be obtained by computing $\Sigma_k w_i (\vec{x}_i - \vec{y}_i) \vec{e}_k$ where $\vec{e}_k$ (k=1, 2, ...) are the eigenvectors, and $\vec{x}_i$ and $\vec{y}_i$ represent the sub-images of $M_1(p_1)$ and $M_2(p_2)$ respectively. The computation of the sub-images $\vec{x}_i$ and $\vec{y}_i$ was described previously. In one implementation, the two images $I_1$ and $I_2$ are subdivided into equal numbers of sub-images $I_{1,l}$ and $I_{2,l}$ (l=1, 2, ...), and sub-images $I_{1,l}$ and $I_{2,l}$ are paired up. The images ($I_1$ and $I_2$) may be subdivided along the Cartesian axes equally.

The correspondence g: $M_1 \rightarrow M_2$ between the two quotient manifolds ($M_1(p_1)$ and $M_2(p_2)$) is obtained to calculate the distance between the two quotient appearance manifold mappings. Automatic 3D volume matching techniques may be used. See, for example, D. Rueckert and A. F. Frangi, *Automatic construction of 3-D statistical deformation models of the brain using nonrigid registration*, IEEE Trans. Medical Imaging, 22 (8):1014-1025, 2003 and G. Guetat, M. Maitre, L. Joly, S.-L. Lai, T. Lee, and Y. Shinagawa, *Automatic 3-D grayscale volume matching and shape analysis*, IEEE Trans. Information Technology in Biomedicine, 10 (2):362-376, 2006, which are herein incorporated by reference for all purposes.

The principal axes may be regarded as part of the spanning vectors of the tangent hyperplane of the quotient appearance manifold mappings when the quotient appearance total spaces are thin. Suppose that the variance of the space is very small along some axes (i.e. the manifold is thin along the axes). The principal axes are orthogonal to them and approximate the tangent hyperplane. It is therefore assumed that each quotient appearance manifold mapping forms a thin subspace such that the hyperplane approximates the quotient appearance total space well.

Alternatively, when the manifolds cannot be approximated by linear structures, nonlinear manifold learning may be used. Nonlinear manifold learning techniques include ISOmetric MAPping (ISOMAP), Locally Linear Embedding (LLE), Laplacianfaces and Riemannian manifold learning. ISOMAP flattens manifolds while trying to preserve the geodesic distances approximated by shortest paths. See J. B. Tenenbaum, V. de Silva, and J. Langford, *A global geometric framework for nonlinear dimensionality reduction*, Science, 290:2319-2323, December 2000, which is herein incorporated by reference for all purposes. LLE calculates the locally linear patches approximating the manifolds. See S. Roweis and L. Saul, *Nonlinear dimensionality reduction by locally linear embedding*, Science, 290:2323-2326, December 2000, which is herein incorporated by reference for all purposes.

Laplacianfaces map face images into the face subspace by Locality Preserving Projections. See X. He, S. Yan, Y. Hu, P. Niyogi and H. J. Zhang, *Face recognition using laplacianfaces*, IEEE Trans. Pattern Analysis and Machine Intelligence, 27 (3):328-340, 2005, which is herein incorporated by reference for all purposes. Riemannian manifold learning calculates the Riemannian normal coordinates that preserve the geodesic metric well. See T. Lin and H. Zha, *Riemannian manifold learning*, IEEE Trans. Pattern Analysis and Machine Intelligence, 30 (7):1270-1281, 2008, which is herein incorporated by reference for all purposes. In order for these methods to work robustly, a great number of data points of the manifolds are typically required.

At step 606, the original set of sample images is projected onto the set of principal components ($P_A$) to generate the features. Each feature vector (x) has n dimensions, where n is the number of principal components in $P^A$. By projecting the images to these principal components, the objects from the same class (e.g., shape class) are assumed to form a cluster in the feature space. To recognize a new object, it is projected to the same set of principal components, and classified as part of the class whose cluster is nearest.

PCA may thus be used to extract the most discriminative features of the object class. The number of features required to train a classifier to achieve high accuracy is advantageously reduced. For example, experimental results have shown that a classifier can achieve high accuracy by training with only 100 features.

Computer-Aided Detection Using HoG

Figure 7:
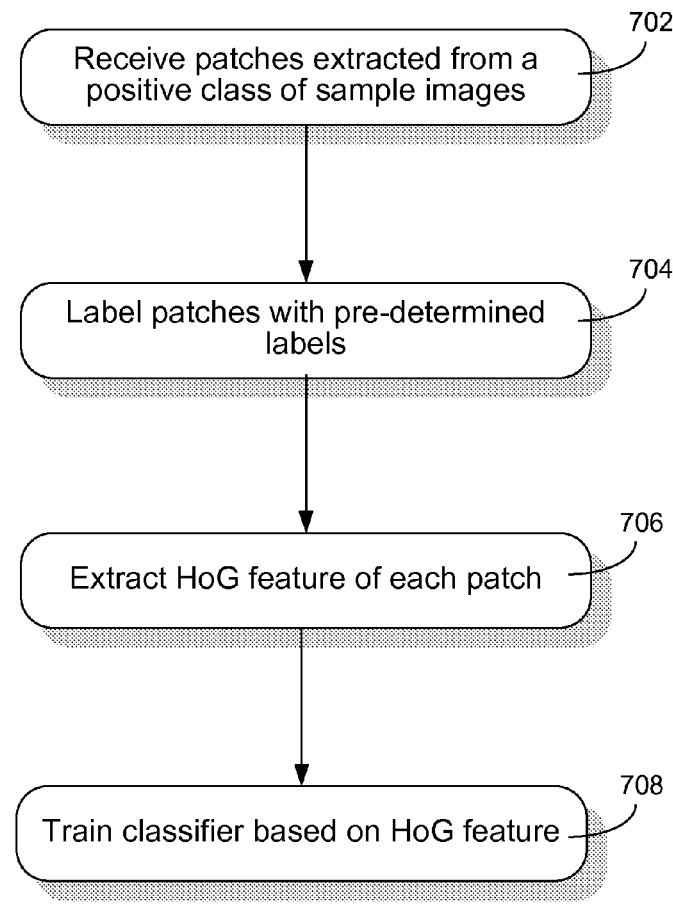
FIG. 7 illustrates an exemplary CAD framework.

FIG. 7 illustrates an exemplary CAD framework 700 for detecting a malignant lesion or tumor captured in image data.

At step 702, patches extracted from a positive class of sample images are received. A "patch," as used herein, refers to a small portion extracted from an image. The positive class includes positive sample images selected from the original set of images that were acquired by, for example, the imaging device 302. The positive class may be associated with a characteristic of a desired object class. For example, the positive class may include all images that are clinically classified or labeled as "smooth." The negative (i.e. complement) class includes all remaining "non-smooth" images from the original set of images. Other types of labels (e.g., "irregular," "lobulated," "nodules," or "polyps") may also be used. The labeling may be performed manually by, for example, a skilled radiologist who reads each image and describes the ground truth shape and/or margin attributes associated with each image. The labels may be hidden from the system during further processing and training.

There are several advantages to processing only the positive sample images. Compared to feature pool approaches, we do not enumerate all possible features. More importantly, the computation demand for training is much less. One problem with previous work is that meaningful features are typically not known ahead, so all possible features are enumerated, resulting in an over-completed set of features. The computational efficiency of such approach is very low because most of the computed features have to be disregarded.

At step 704, the patches are labeled with pre-determined labels. In one implementation, the patches are labeled either as "smooth" or "irregular". Other suitable types of labels are also useful. The labeling may be performed manually by, for example, a skilled radiologist reading each image and describing the ground truth shape and boundary attributes.

At step 706, a histogram of oriented gradients (HoG) feature is extracted for each patch. The HoG approach in the present framework is suitable for classifying boundaries because it is capable of directly capturing local properties of the images. The HoG feature is computed by counting occurrences of gradient orientation in localized portions of an image, and using the average intensity of the patch as an additional feature component.

Figure 8A:
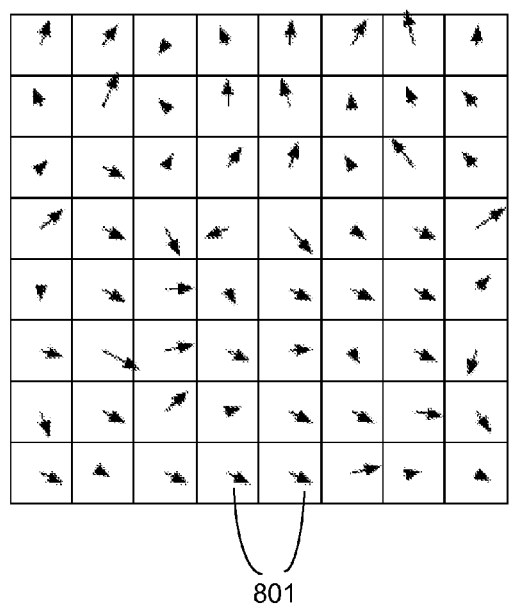
FIG. 8a shows directional gradients of an 8×8 image patch.
Figure 8B:
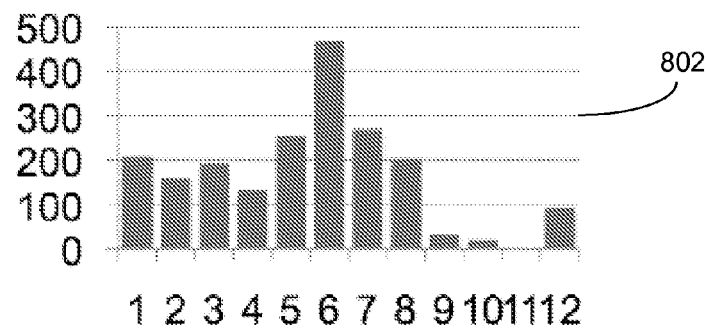
FIG. 8b shows sample histograms corresponding to irregular patches.
Figure 8B:
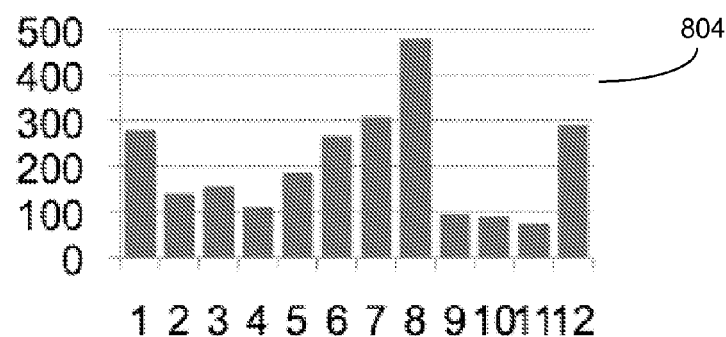
Figure 8B:
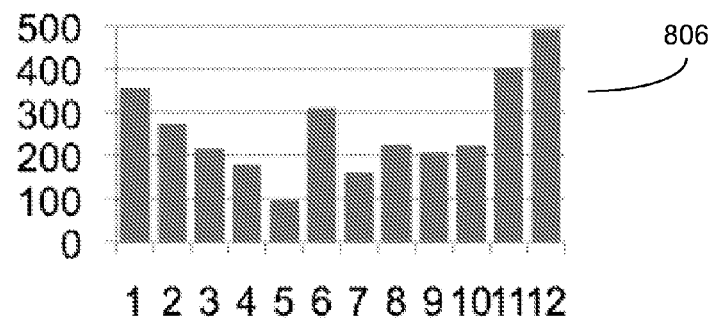
Figure 8C:
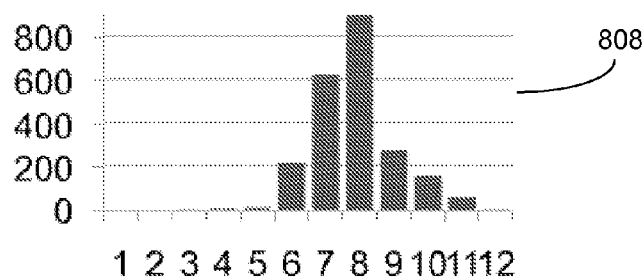
FIG. 8c shows sample histograms corresponding to smooth patches.
Figure 8C:
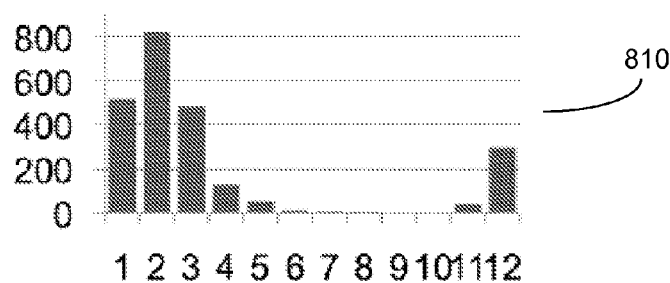
Figure 8C:
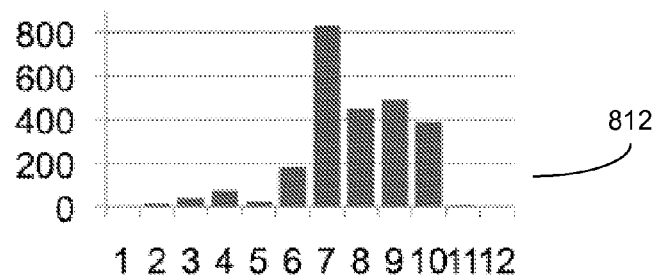

In particular, the orientation and the magnitude of the gradient at each pixel of the patch is first calculated, and then binned accordingly. Each bin corresponds to the number of gradients with a specified orientation. The number of bins used may be 12 (i.e. consecutive bins are 30 degrees apart) or any other suitable number. For example, FIG. 8a shows the directional gradients (801) of an 8×8 image patch generated by the present framework. FIG. 8b shows sample histograms (802, 804, 806) corresponding to irregular patches and FIG. 8c shows sample histograms (808, 810, 812) corresponding to smooth patches. It can be observed that patches with irregular boundaries in FIG. 8b have more uniformly distributed histograms than those with smooth boundaries in FIG. 8c.

Boundary effects may be observed where the belonging bin changes from one to another. Such boundary effects affect the accuracy of the classification, and may be avoided by performing bilinear interpolation. Bilinear interpolation may be achieved by multiplying each gradient magnitude by a width of (1−d), where d is the distance of the sample orientation from the central orientation of the bin containing the gradient.

For example, suppose that Bin 1 contains Orientations 1, 2, and 3, and that Bin 2 contains Orientations 4, 5, and 6. In the presence of noise, a patch having Orientation 3 may be captured as Orientation 4, which results in Bin 1 being decreased by 1 and Bin 2 increased by 1. To avoid this kind of instability, interpolation may be performed. This may be achieved by computing the number of objects belonging to Bin 1 by N1*(1−d)+N2*1+N3*(1−d)+N4*(1−2d)+N5*(1−3d)+ . . . , wherein Ni (i=1, 2, 3, . . . , n) is the number of objects with Orientation I, and N1+N2+N3 is the number of objects originally belonging to Bin 1. The distance (d) may be, for example, $1/12$.

After the HoG features are extracted, at least one classifier may be trained based on the HoG features. Training may be performed using AdaBoost, as previously discussed with respect to step 408 shown in FIG. 4. The present framework advantageously produces a very discriminative feature space, which aids in training a boundary classifier with high accuracy.

Figure 9:
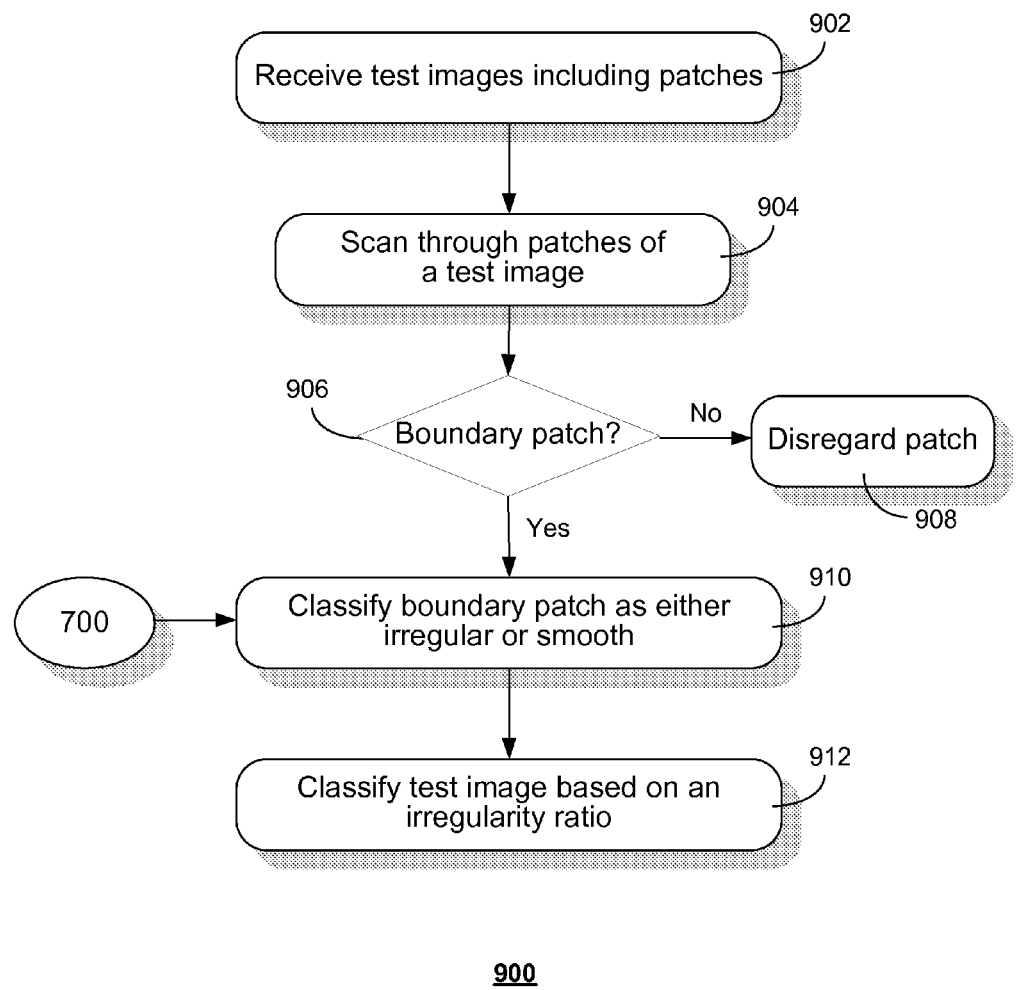
FIG. 9 shows an exemplary method of testing a classifier.

FIG. 9 shows an exemplary method (900) of testing the validity and accuracy of boundary classifiers obtained by the framework 700.

At step 902, a set of test images is received. Patches may be extracted from the test images.

At step 904, patches within a test image are scanned. The scanning may be performed automatically by, for example, the computer system 301.

At step 906, boundary patches are extracted during the scanning. A patch is determined to be a boundary patch if it has a discernable boundary or its intensity variance is above a threshold value (e.g., 0.5). Computing the intensity variance is a relatively computationally efficient process. Other parameters of pixel variation within the patch may also be used to detect the presence of a boundary. If the patch is not a boundary patch, it is disregarded at step 908 and not included in further computation. If the patch comprises a boundary patch, it is classified at step 910.

At step 910, the boundary patch is classified by applying a boundary classifier. The boundary classifier may be obtained by, for example, framework 700 described in relation to FIG. 7. The boundary classifier classifies the boundary patch as either "irregular" or "smooth." Steps 906, 908 and 910 may be repeated until all the patches in a test image are processed.

At step 912, the test image is classified based on an irregularity ratio. The irregularity ratio may be defined as $$\frac{N_{irregular}}{N_{smooth} + N_{irregular}},$$

where $N_{irregular}$ and $N_{smooth}$ represent the number of smooth and irregular boundary patches respectively in the test image.

Experimental Results

Unless otherwise stated below, a database of 83 breast MR original sample images were used to conduct the following experiments. To remove scale variance, the sub-volume was further sampled into a resolution of 20×20×10 for the purpose of achieving computational efficiency. The sample images were associated with a ground truth description file, which included shape/boundary labels for each lesion. The type of lesion shape included round, oval, irregular and lobular, while the type of boundary included smooth, irregular and spiculated.

100 iterations of AdaBoost were applied, and the receiver operating characteristic (ROC) curves of leave-one-out cross-validation (LOOCV) were plotted to depict the accuracy of the generated classifiers. A ROC curve was represented by plotting a fraction of true positives (TPR=true positive rate) against a fraction of false positives (FPR=false positive rate). LOOCV was used to avoid the effect of a small number of samples. In general, LOOCV involved using a single observation removed from the training data as the validation data. Thus, a particular instance of training data, for example, representing one patient, may be removed from the set of training data. Classifiers were generated without this particular instance of data, and tested upon the particular instance of data to see if the classifiers could effectively classify the left-out instance of data in accordance with its known disposition.

Shape Classification

First, the gains in accuracy from using different numbers of training sample images were compared. The training set was enlarged by creating different number of rotational variants for each sample. It was desirable for the classifier to be rotation invariant and to have more training sample images to capture the variance within a class, particularly since the features were extracted from the sample images using PCA.

Figure 10:
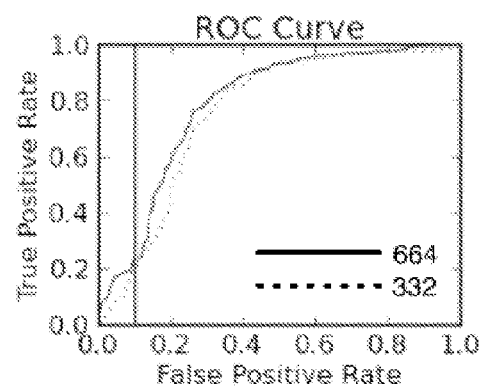
FIG. 10 shows various ROC curves obtained for various shape classifiers by using different numbers of training samples.
Figure 10:
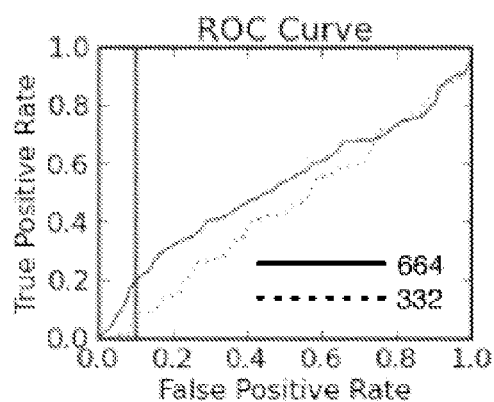
Figure 10:
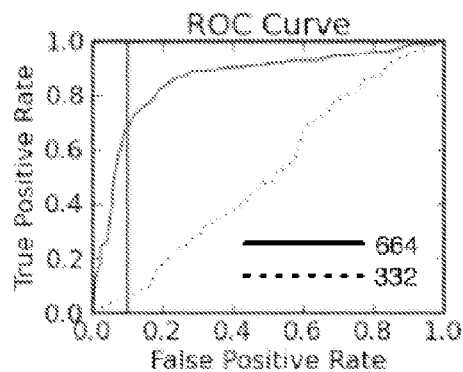

FIG. 10 shows various ROC curves obtained for different shape classifiers: (A) round/oval; (B) lobular; and (C) irregular. The broken line denotes the ROC curve obtained using 332 sample images with 4 rotational variants (0, 90, 180 and 270 degrees) and the solid line denotes the ROC curve obtained using 664 sample images with 8 rotational variants (0, 90, 180, 270, 45, 135, 225 and 315 degrees). It can be observed that accuracy is improved with the use of more sample images, especially for the irregular shape classifier (C).

Figure 11:
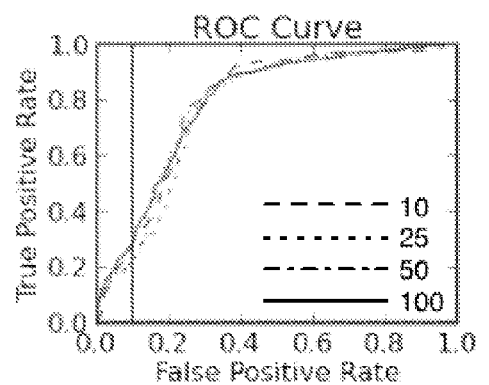
FIG. 11 shows various ROC curves obtained for various shape classifiers by using different numbers of highest ranked dimensions for training.
Figure 11:
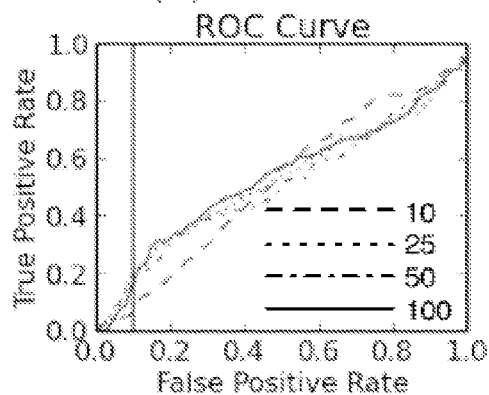
Figure 11:
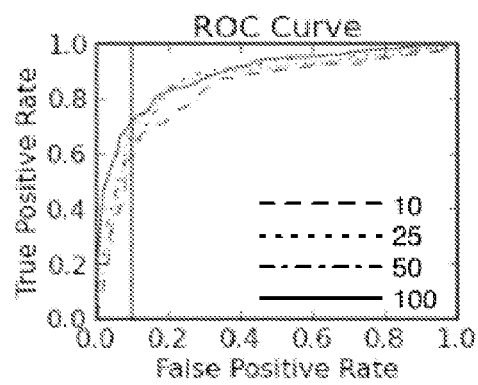

Next, the differences in performance from using different numbers of highest ranked dimensions for training was investigated. 4 different numbers of dimensions (10, 25, 50 and 100) were used in the enlarged set of 664 sample images. The results are shown in FIG. 11. It can be observed that for round/oval shape classifier (A), accuracy did not improve much with the use of more dimensions. However, for the irregular shape classifier (C), accuracy was substantially improved by using 100 dimensions, as compared to using fewer dimensions. This is a reasonable result since irregular shapes have more variations than oval shapes, thereby necessitating the use of more dimensions for training its classifier.

Figure 12:
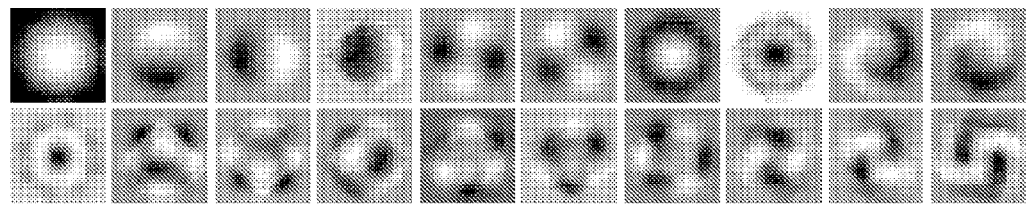
FIG. 12 shows the central slice of a volume from the axial view of the 20 highest ranked principal components for various classes.
Figure 12:
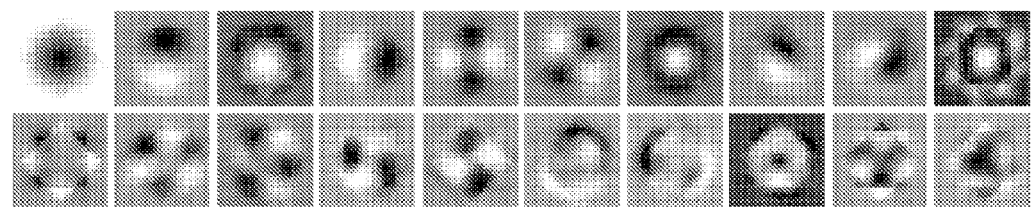
Figure 12:
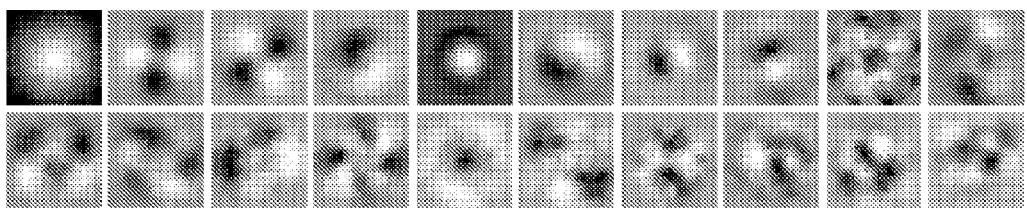

From the above experiments, only the irregular shape classifier performed at an acceptable accuracy, while the oval and lobular shape classifiers performed poorly. This may be explained by visualizing the principal components extracted from each class. FIG. 12 shows the central slice of a volume from the axial view of the 20 highest ranked principal components for each class (A, B, C) respectively. It can be observed that the patterns of the top principal components down to the $8^{th}$ principal component are mostly low frequencies and are very similar for all shape classes, with slightly different orders. i.e. the classes were very similarly interpreted in PCA space and hence, it was difficult to separate the classes. It means that the fibers of the appearance manifolds of the classes were entangled, which emphasizes the need to apply quotient appearance manifold mapping to untangle the fibers. Higher frequencies that distinguish the class differences were obtained when quotient appearance manifold mapping was applied in another experiment, as will be discussed later with reference to FIG. 14.

Boundary Classification

Next, the performance of the boundary classification in accordance with the present framework was evaluated. To train the patch classifier, 50 patches of size 8×8 were cropped from both irregular and smooth sample images. The corresponding 12-bin histograms were then computed. The average intensity of the patch was also used as an additional feature component, thereby creating a 13-dimensional feature vector for each patch.

Figure 13A:
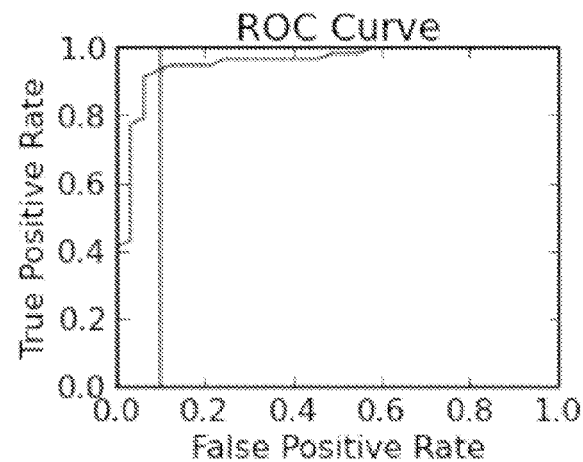
FIG. 13a shows the ROC curve of a trained boundary classifier.

The boundary patch classifier was trained by using Ada-Boost. FIG. 13a shows the ROC curve of the trained boundary patch classifier. The image was scanned every 4 pixels in x and y directions. Since a volume consisted of 10 slices (images) of size 20×20, the total number of patches scanned were only 250, which greatly improved computational efficiency. Finally, the irregularity ratio of the boundary was computed by discarding the patches that did not satisfy the boundary condition.

Figure 13B:
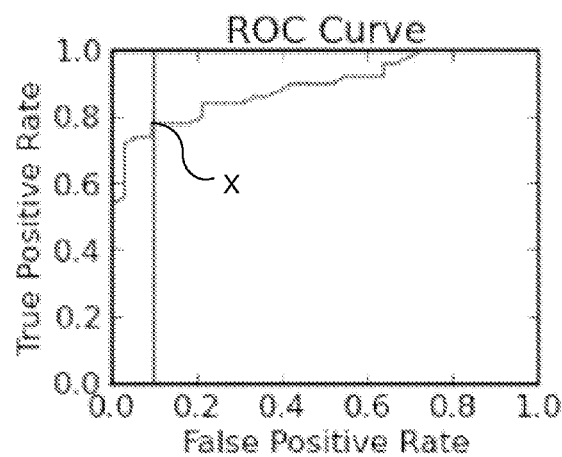
FIG. 13b shows the ROC curve of the image classifier.

FIG. 13b shows the ROC curve of the image classifier. The ROC curve of the image classifier was plotted by adjusting the threshold of the irregularity ratio. As can be observed from point X, the final accuracy achieved was a true positive rate (TP) of 0.78 and a false positive rate (FP) of 0.1.

Quotient Appearance Manifold Mapping

In yet another experiment, the effectiveness of the quotient appearance manifold mapping in classifying a medical grayscale volume was evaluated. 76 lesions from 39 patients were used as the training set. There were 31 mass lesions (5 round, 13 oval, 8 lobulated and 5 irregular shapes, and 23 smooth, 5 irregular and 3 spiculated margins), 26 non-mass lesions, and 19 other tissues that were treated as negative samples.

For shape classification, the mean and covariance of sub-images $J_{i,j,k}$ with rotational variations were calculated for each group of round, oval, lobulated and irregular lesions respectively. Principal components were obtained by computing the eigenvectors $\vec{e}_i(i=1, 2, \ldots)$ of the covariance matrix. The principal components whose eigenvalues were smaller than a threshold were discarded. Finally, the sub-images were projected to the principal components axes by $a_i = \vec{x}_{i,j,k} \cdot \vec{e}_i (i=1, 2, \ldots)$ where $\vec{x}_{i,j,k}$ is the stacked vector of a sub-image. The projected values $a_i$ were used as the feature values for machine learning. For boundary classification, the three classes (smooth, irregular and spiculated) were handled in the same manner as described above.

Figure 14:
FIG. 14 shows the middle slices of a volume from the axial view of the 10 highest ranked principal components of the quotient appearance manifold mapping for various classes.
Figure 15A:
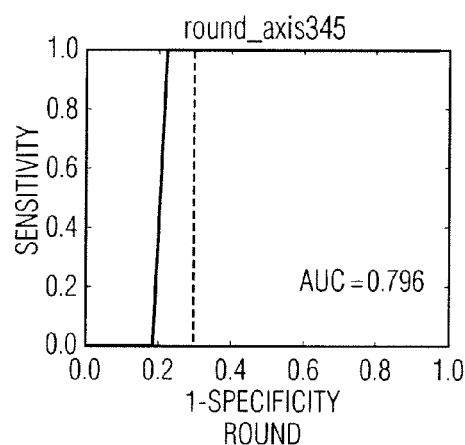
FIG. 15 shows the ROC curves of classification of various mass shapes.
Figure 15B:
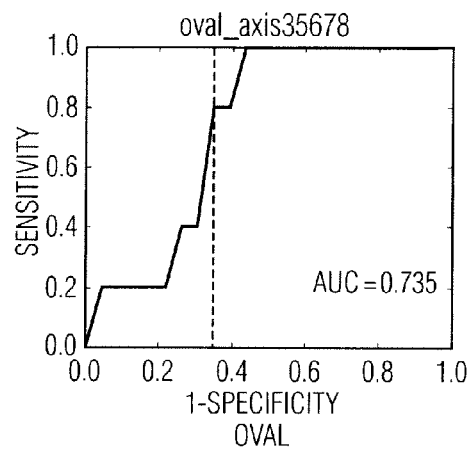
Figure 15C:
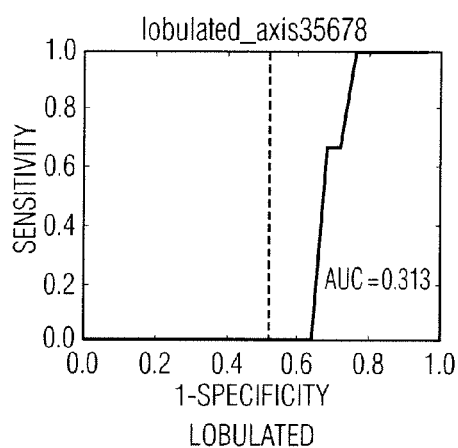
Figure 15D:
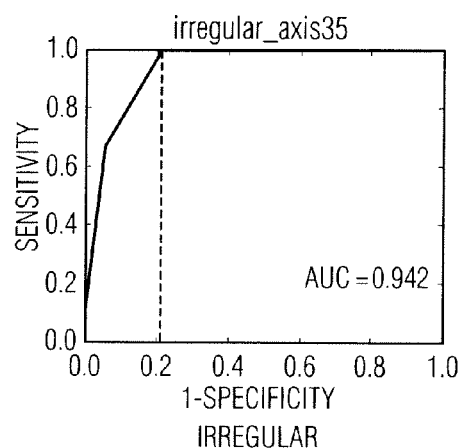

FIG. 14 shows the middle slices of the volume from the axial view of the 10 highest ranked principal components of the quotient appearance manifold mappings for each class:

(A) round; (B) oval; (C) lobulated; (D) irregular; (E) smooth; (F) irregular margin, and (G) spiculated. In comparison to FIG. 12, the principal components in FIG. 14 contain higher frequencies that allow class differences to be distinguished.

Quadratic Discriminant Analysis (QDA) was used to train and generate the classifier since it performed well with a relatively small number of features (i.e. principal components). For each description, the best quadratic surface that separated the positive and negative sets was calculated. The combination of principal axes that gave the best result for the training set was chosen. The same axes thus selected were used in the test phase. The threshold of the QDA was chosen so that the predetermined specificity (e.g., 0.8) was attained for the training set.

The test set was disjoint from the training set. There were 33 lesions from 20 patients. There were 18 mass lesions (1 round, 5 oval, 3 lobulated and 9 irregular shapes, and 9 smooth, 3 irregular and 6 spiculated boundaries), 11 non-mass lesions, and 5 other tissues. Each lesion was subdivided into sub-images and rotated in the same manner as the training set.

Figure 16A:
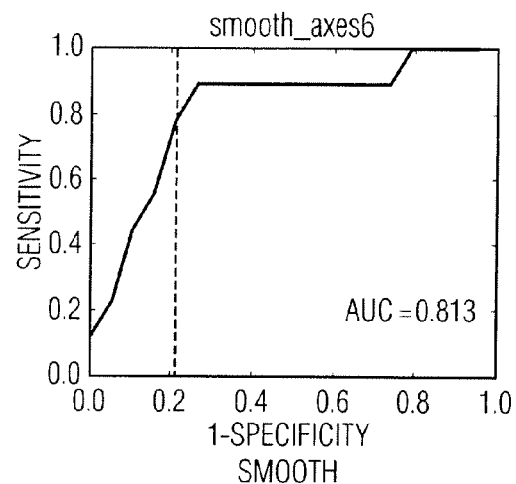
FIG. 16 shows the ROC curves of classification of various mass boundaries.
Figure 16B:
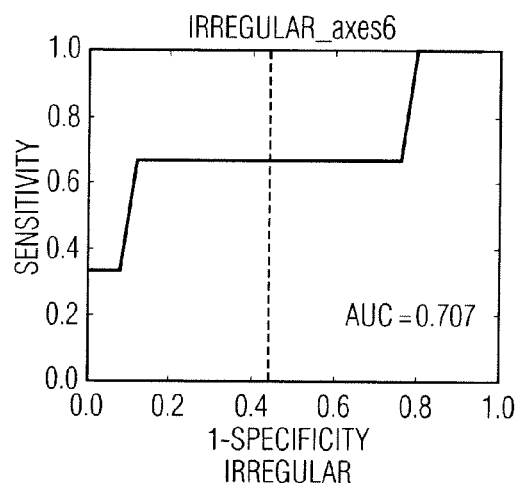
Figure 16C:
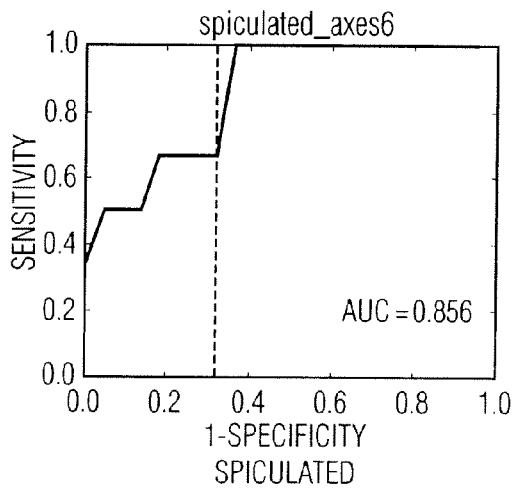

FIG. 15 shows the ROC curves of classification of mass shapes: (A) round (AUC=0.796), (B) oval (AUC=0.735), (C) lobulated (AUC=0.313) and (D) irregular shapes (ACU=0.942). FIG. 16 shows the ROC curves of mass boundaries: (A) smooth (AUC=0.813), (B) irregular (AUC=0.707) and (C) spiculated (AUC=0.856). Comparing these curves with the ROC curves without quotient appearance manifold mappings shown in FIGS. 10 and 11, significant improvement may be observed in all categories.

Comparison of Quotient Appearance Manifold Mapping and Customized Features

Customized features were developed for comparison with the performance of quotient appearance manifold mapping and to show that shape and boundary in the clinical sense is not a trivial image processing task.

The first feature was the histogram of angles between adjacent voxels on the lesion boundary. When the boundary was smooth, the angle histogram had smaller variations than when the boundary was irregular. The second feature captured how the lesion shape deviated from a sphere, by calculating the number of lesion voxels inside spheres centered at the lesion centroid. When the radius r was varied, the ratio of the numbers of such voxels to the sphere volume was be regarded as a function of r. The feature was expected to capture whether the shape was round, oval or irregular. Other features used included the ratio of the volume V and the volume of the circumscribed sphere $\sqrt{S}/V^{1/3}$ where S is the surface area, and aspect ratios along x, y and z axes.

The results in the following Table 1 show the sensitivity and specificity of customized features for the testing set.

TABLE 1

| Description | Sensitivity | Specificity |
| --- | --- | --- |
| Shape round | 0 | 83 |
| Shape oval | 50 | 78 |
| Shape lobulated | 0 | 80 |
| Shape irregular | 60 | 75 |
| Boundary smooth | 86 | 33 |
| Boundary irregular | 100 | (denominator is 0) |
| Boundary speculated | 90 | 67 |

It can be observed that the quotient appearance manifold mappings (illustrated by FIG. 15-16) outperform the customized features. In addition, it can also be shown that the clinical smoothness or irregularity of a lesion is not a simple geometric smoothness of a volume. For example, the difference between round and oval shapes may not be obtained just by measuring the aspect ratios of width, height and depth. Oval objects are more likely to be fibroadenomas, so the look of a fibroadenoma affects the shape description.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

What is claimed is:

1. A computer-implemented method for classifying an object, comprising:
    (a) constructing, by a processor, at least one quotient appearance manifold mapping based on a sample image to untangle appearance fiber bundles of different objects, wherein the at least one quotient appearance manifold mapping associates points of an appearance manifold to a quotient manifold;
    (b) reducing, by the processor, dimensionality of the quotient appearance manifold mapping to generate at least one feature characteristic of the sample image; and
    (c) training, by the processor, based on said feature, at least one classifier adapted for associating the object with an object class.

2. The method of claim 1 further comprising:
    acquiring, by an imaging device, the sample image by one of a magnetic resonance (MR) imaging, computed tomographic (CT), helical CT, x-ray, positron emission tomographic, fluoroscopic, ultrasound and Single Photon Emission Computed Tomography (SPECT) technique.

3. The method of claim 1 wherein the sample image comprises a medical image of an anatomical part.

4. The method of claim 1 wherein the sample image comprises a grayscale three-dimensional (3D) image.

5. The method of claim 1 wherein the classifier comprises a shape classifier.

6. The method of claim 1 wherein the classifier comprises a boundary classifier.

7. The method of claim 1 wherein the object corresponds to a lesion.

8. The method of claim 7 wherein the classifier is adapted to indicate a likelihood of malignancy of the lesion.

9. The method of claim 1 wherein the step (a) comprises:
    (d) associating a neighborhood with a pixel of the sample image; and
    (e) constructing a quotient manifold of the neighborhood.

10. The method of claim 9 wherein the step (d) comprises sub-dividing the sample image into a plurality of sub-images.

11. The method of claim 10 wherein the step (e) comprises applying an equivalence relation to a sub-image.

12. The method of claim 11 wherein the equivalence relation comprises an affine transformation.

13. The method of claim 11 wherein the step (e) comprises transforming the sub-image to another sub-image with a canonical position, size and posture that account for a transformation.

14. The method of claim 9 further comprising:
    (f) mapping the sample image to a set of quotient manifolds, wherein said set of quotient manifolds approximates the quotient appearance manifold mapping.

15. The method of claim 1 wherein the step (b) comprises:
(g) computing, using principal component analysis (PCA), a set of principal components based on the quotient appearance manifold mapping; and
(h) projecting the sample image onto the principal components to generate the feature.

16. The method of claim 1 wherein the step (c) comprises performing adaptive boosting (AdaBoost) to train the classifier.

17. The method of claim 1 wherein the step (c) comprises performing Quadratic Discriminant Analysis (QDA) to train the classifier.

18. A non-transitory computer usable medium encoded with computer readable program code, said computer readable program code adapted to be executed to implement a method for classifying an object, comprising:
(a) constructing at least one quotient appearance manifold mapping based on a sample image to untangle appearance fiber bundles of different objects, wherein the at least one quotient appearance manifold mapping associates points of an appearance manifold to a quotient manifold;
(b) reducing dimensionality of the quotient appearance manifold mapping to generate at least one feature characteristic of the sample image; and
(c) training, based on said feature, at least one classifier adapted for associating the object with an object class.

19. An image analysis system, comprising:
a memory device for storing computer readable program code; and
a processor in communication with the memory device, the processor operative with the computer readable program code to
(a) construct at least one quotient appearance manifold mapping based on a sample image to untangle appearance fiber bundles of different objects, wherein the at least one quotient appearance manifold mapping associates points of an appearance manifold to a quotient manifold;
(b) reduce dimensionality of the quotient appearance manifold mapping to generate at least one feature characteristic of the sample image; and
(c) train, based on said feature, at least one classifier adapted for associating the object with an object class.

* * * * *